(12) United States Patent
Amis

(10) Patent No.: US 8,630,820 B2
(45) Date of Patent: Jan. 14, 2014

(54) METHODS AND SYSTEMS FOR THREAT ASSESSMENT, SAFETY MANAGEMENT, AND MONITORING OF INDIVIDUALS AND GROUPS

(75) Inventor: David Amis, Durango, CO (US)

(73) Assignee: Strider, Inc., La Vista, NE (US)

( * ) Notice: Subject to any disclaimer, the term of this patent is extended or adjusted under 35 U.S.C. 154(b) by 530 days.

(21) Appl. No.: 12/862,117

(22) Filed: Aug. 24, 2010

(65) Prior Publication Data

US 2011/0046920 A1 Feb. 24, 2011

Related U.S. Application Data

(60) Provisional application No. 61/236,265, filed on Aug. 24, 2009.

(51) Int. Cl.
*G06F 11/30* (2006.01)
*H04M 11/04* (2006.01)

(52) U.S. Cl.
USPC .................................. 702/186; 455/404.1

(58) Field of Classification Search
USPC ............................. 702/186, 181–183, 188; 455/404.1–404.2, 403, 410, 550.1; 705/325; 709/217, 219; 342/357.25
See application file for complete search history.

(56) References Cited

U.S. PATENT DOCUMENTS

2005/0085257 A1* 4/2005 Laird et al. ................ 455/550.1
2008/0094230 A1* 4/2008 Mock et al. ................ 340/573.4

* cited by examiner

*Primary Examiner* — Toan Le
(74) *Attorney, Agent, or Firm* — Maulin V. Shah

(57) ABSTRACT

The disclosure generally relates to methods and systems anticipating a potentially threatening or dangerous incident, and providing varying levels of response to a user. In an exemplary embodiment, the present invention provides varying levels of assistance to a user prior to, during, and after a threatening incident occurs. By providing assistance prior to a threatening incident occurring, the system may be able to thwart potential attacks, bodily harm, robberies, break-ins, and other criminal or dangerous activity. The assistance can be, for example, in the form of deterrents, alerting first responders to go to the scene, sending security personnel to the scene, remotely monitoring the scene, remotely interacting with the scene, providing information and advice to the user.

20 Claims, 6 Drawing Sheets

METHODS AND SYSTEMS FOR THREAT ASSESSMENT, SAFETY MANAGEMENT, AND MONITORING OF INDIVIDUALS AND GROUPS

CROSS-REFERENCE TO RELATED APPLICATIONS

This application claims the benefits of U.S. Provisional Application No. 61/236,265, filed on Aug. 24, 2009, the contents of which are hereby incorporated by reference in its entirety.

BACKGROUND

1. Field of the Invention

The present invention relates generally to the field of determining the safety/threat level of an individual, providing a host of capabilities, systems, procedures and technology to improve that safety level or address specific threats, to an algorithm that receives information from various sources, including the user, to determine and manage their safety level, and to a remote monitoring center which provides active support not only for managing user safety and specific threats, but also for emergency and non-emergency response during pre-incident, incident, incident respite, and post incident situations.

2. Description of Related Art

We are constantly reminded of the need for personal safety in today's society. The average person will be a victim of one or more crimes in their lifetimes. Meanwhile, significant constraints exist on the current criminal justice system as well as on private security companies to protect people. It follows that alternatives to traditional 911 emergency system response would be beneficial. For example, some alternatives provided by the present invention include: a "stand-by 911" button which allows a user to walk through a dangerous area knowing that by only releasing the button their GPS coordinates and a 911 call will be communicated, the interruption of a crime in progress through electronic and other means (e.g. a speaker is turned on remotely and an officer speaks to the perpetrator), delay of a crime in progress (e.g. by having an alarm on a phone which indicates emergency or security personnel are aware of the situation and/or en-route) and virtually escorting an individual as they encounter an unknown person such as on a blind date or in another situation. It also follows that awareness of and management of an individual's safety/danger level as well as the ability to address specific threats would be beneficial. For example, if on a blind date, a user may request a regular check-in or monitoring of location relative to a planned itinerary. If either appears suspicious, appropriate action could be taken. Providing information on safe places to meet, investigating the proposed date, collecting identifying information, and establishing user routines would all have the effect of mitigating the threat of rape, assault, robberies, etc. An intelligent system which can assess risk, provide a measurable rating, and recommendations to reduce that risk, would reduce the likelihood of an incident, mitigate the effect if one does occur, and bring peace and well-being to the user.

Today's technology provides us with public services such as the 911 telephone number for rapidly summoning emergency help if we are able to access a telephone, dial the number, and communicate our location. However, these services fall short in the case of a young child, a mentally incompetent or medically incapacitated person, someone lost in the woods, the victim of an abduction or kidnapping or any individual that is in the middle of a violent crime and therefore cannot use current cellular phone or traditional communication technologies to call for assistance. These situations necessitate a security system that travels with the individual, is not limited in range, is able to define and signal an emergency situation without human intervention and sometimes in the most chaotic and violent situations, and that may identify the individual's location. Such a system would provide protection and peace of mind to the individual, as well as peace of mind to those responsible for his or her care and well-being.

Current available technology does not address the case of an individual who is helpless in an emergency situation where information is required so that the appropriate authorities can respond quickly and efficiently to a distress signal generated by the individual. Providing personal safety for persons at risk demands a fully automated and responsive system for summoning assistance. Current technology also does not measure one's relative level of danger or safety and does not take into consideration measurable factors such as, for example, atypical movement or time-based activity, geographic crime levels, time of day, or other factors.

Additionally, children are abducted daily in our society by strangers, family and friends. Police response frequently occurs hours after such abduction. In many cases the children are harmed and in some cases they are killed. There are child-tracking devices commercially available which are capable of monitoring the location of the missing child but there are no known commercially available devices that monitor the children's' activities and surroundings that may indicate danger is imminent. These commercially available devices cannot monitor the movements of a person with the intent to abduct or harm a child as the person approaches the child. Further, these devices cannot warn the child to run away and seek safety nor do they provide an evidence-gathering ability which can serve as a deterrent and a further system to protect children and other vulnerable populations.

In addition, current personal GPS devices that are worn or carried allow an individual's location to be tracked and, in some cases, allow help to be summoned in an emergency by transmitting the current location of the individual to providers of emergency services. However, these systems fail to convey potentially valuable information such as a voice message, an image and/or a movie/video. For example, this information could be useful in identifying a perpetrator suspect or for determining what type of emergency response (e.g., police, ambulance, and fire) is appropriate. Another drawback of current systems is that they fail to integrate other common portable devices, such as cellular phones and PDAs (Personal Digital Assistants). Having one more electronic device to carry reduces the likelihood that an individual will lose it.

In addition, current systems do not allow for variable responses based on an individual, situation, or environment scale of safety/danger status. One can either call 911 and initiate an official response or decide not to call 911. Alternatively, one can either call a security company or not. There is no intermediate service that can bridge this gap.

Furthermore, current security systems do not anticipate when a threatening incident will occur, or may occur. Thus, current systems only assist users while an incident is occurring, or after an incident has already occurred. Current systems do not provide intelligence and support that anticipates an incident, and provides assistance in hopes of preventing harm or injury to the user before an incident occurs. Current systems do not manage relative safety levels or provide tools to deal with possible threats, nor do they provide tools to improve the safety level.

Therefore, there is a need for systems and methods that overcome the deficiencies of traditional personal safety monitoring, signaling, alerting and response systems.

SUMMARY

In an embodiment, the present invention provides a proprietary algorithm which utilizes data from a variety of sources to anticipate and determine a potentially threatening incident. The algorithm then provides a threat assessment of the user, and provides a recommended course for response to a remote monitoring center. The response is used to thwart and mitigate any anticipated threatening incidents, such as bodily harm, robberies, floods, and other criminal or dangerous activity or disasters. It also helps to maintain a better-than-normal safety awareness and safety level.

For the purposes of this invention, an "incident" is defined as a potential or actual occurrence which puts a user's health or well-being at risk. These can include an assault, entering a dark home, going on a blind date, encountering an unknown individual, dealing with injuries from a rape, etc. An "incident" is not limited to criminal activity and actual events, but also threats, situations which may affect a relative safety level and outcomes of possible events.

In another embodiment, the present invention provides varying levels of assistance to a user prior to, during, and after a threatening incident occurs. By providing assistance prior to a threatening incident occurring, the system may be able to thwart potential attacks, bodily harm, robberies, break-ins, and other criminal or dangerous activity. The assistance can be, for example, in the form of deterrents, alerting first responders to go to the scene, sending security personnel to the scene, remotely monitoring the scene, remotely interacting with the scene, providing information and advice to the user, etc. and providing techniques, technology and systems to deter, avoid, mitigate, and delay perceived threats.

In an embodiment, the present invention enables an individual in distress to initiate an alarm to alert appropriate personnel combined with a locating and tracking system that enables the alerted personnel to monitor the location of the individual in distress and provide varying levels or response.

In another embodiment, the present invention provides a system and methods of determining when an individual is in distress or when the relative safety level of an individual has changed. The invention can then electronically or otherwise acquire additional information from third-party or in-house sources to assure the individual's safety, or alternatively, take appropriate action to intervene.

In yet another embodiment, the present invention provides a system and methods of collecting evidence at a scene that can be used for downstream forensic analysis, perpetrator prosecution, etc., which provides a deterrent to would-be perpetrators and for civil suits or other actions which require the use of factual information concerning an incident or other act.

In another embodiment, the system utilizes a variety of technological innovations including hardware, software, electronic communication, and systems to improve the safety level of an individual or group, to assess their risk and to help them when in moderate or serious danger.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
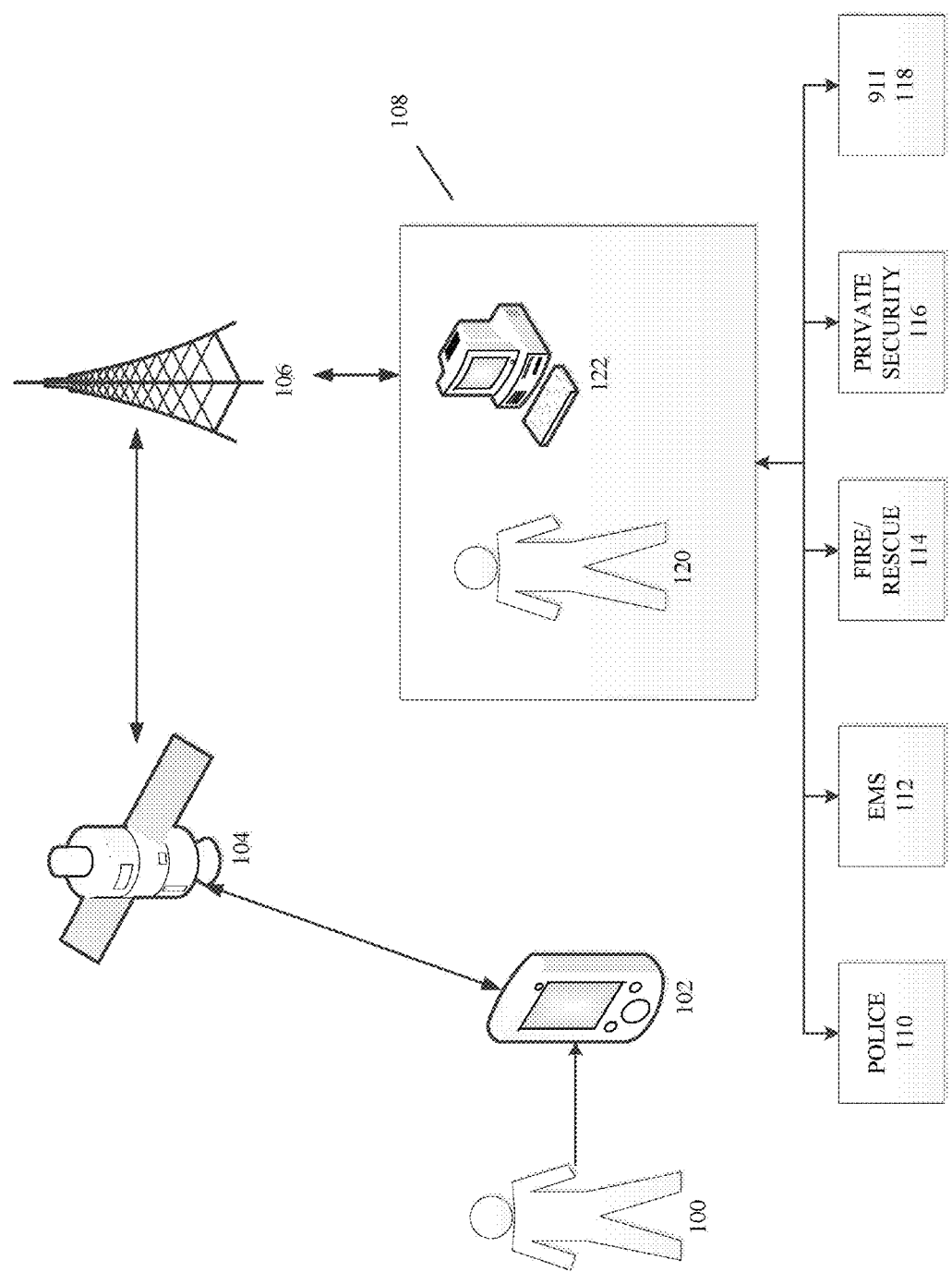
FIG. 1 is a schematic of a personal safety and tracking system in accordance with an embodiment of the present invention.

FIG. 1 is a schematic of a personal safety and tracking system in accordance with an embodiment of the present invention. Referring to FIG. 1, the personal safety and tracking system according to the present invention generally includes a personal safety device 102 which is located on or near the user 100. In a preferred embodiment, the user 100 can be a person, such as a child, elderly person, disabled person, a person living alone, a real estate agent, a mail courier, an undercover law enforcement agent, a postal delivery worker, a teenager, etc., each having a personalized suite of security services based on their activity, accessibility, vulnerability, and potential occupational hazards.

For exemplary purposes, a satellite communication system is depicted in FIG. 1. However, any type of communication system which allows for positioning can be used, such as, for example, using multiple cellular phone towers to transmit data and triangulate a user's position. In another embodiment, user devices, such as cellular phones, can be used to triangulate another user's position, as well as transmit data through their mobile network to a remote monitoring center.

The communications depicted in FIG. 1 are multi-directional (i.e., two-way, and three-way) communications. That is, the remote operating center 108 receives data from the device 102, but can also transmit data to the device 102, as well as to the communication tower 106. The communication tower 106 can transmit the received data to other third-party destinations, such as to first responder and health provider communication systems.

The personal safety device 102 can be a standalone personal safety device, or can be incorporated into a cellular phone, portable music player, keychain, pager, PDA, or other portable communication device. In another embodiment, the personal safety device 102 can be worn on the user 100, such as around the user's neck (i.e., necklace or dog collar), ankle (i.e., anklet or ankle bracelet), or as a wristband (i.e., watch strap, watch). In a preferred embodiment, the personal safety device 102 is a multi-function device that includes signal reception and transmission capabilities, and includes a cellular phone capability that allows the user 100 to communicate with a remote location. The personal safety device 102 is described in more detail in FIG. 2.

The personal safety device 102 is configured to transmit an alarm signal to a satellite or global positioning system (GPS) which makes up a communications system 104. The communications system 104 is configured to identify the origination location of an alarm signal transmitted from a personal safety device 102. It should be appreciated by one skilled in the art that various types of locating and satellite systems, such as, but not limited to, LORAN-C or GLONASS, may perform the function of providing accurate position coordinates and may be substituted thereof. Hence, the present invention should not be construed as limited to the communications system 104.

As mentioned above, position information can also be determined by using cellular triangulation using cellular towers or other mobile devices in the vicinity of the user. In another embodiment, the internet protocol (I.P.) address of device 102 can be used to determine its physical location. In this embodiment, the I.P. address of the device 102 and/or the device's network accesses is continually tracked and recorded by the remote monitoring center 108.

In another embodiment, the personal safety device 102 does not employ GPS for communications with a remote monitoring center 108, but rather utilizes Earth-based telecommunications towers, such as communication tower 106, which are part of the current wireless communications and cellular grids. In this embodiment, the GPS only provides latitude and longitude coordinate determining means to locate the global position of the user 100 via the personal safety device 102.

The communications system 104 further provides a means for data and voice communications between the personal safety device 102 and a remote monitoring center 108. In an embodiment, a communication tower 106 receives an alarm signal from the communications system 104 and routes it to the remote monitoring center 108. Multiple remote monitoring centers 108 are scattered throughout the country, so that an alarm signal sent from a personal safety device 102 is routed to the nearest remote monitoring center 108.

The communications system 104 provides a means for data and voice communications between the personal safety device 102 and a remote monitoring center 108 in real-time. The communications system 104 may be any conventional cellular or wireless communications system. It should also be appreciated by one skilled in the art that other types of communication devices such as satellite transceivers or any other two-way wireless communication system may perform the function of the communications system 104, and these may easily be substituted thereof. Hence, the present invention should not be construed as limited to communications system 104 as described herein.

The remote monitoring center 108 serves as a go-between the user 100 and various service providers and first responders, such as police departments 110, emergency medical service (EMS) providers 112, fire and rescue departments 114, volunteer organizations, volunteers, employees, private security providers 116, and 911 emergency centers 118. The list of service providers and first responders is not limited to the examples provided in FIG. 1, and can include federal agencies, task forces, non-governmental agencies, relief agencies and workers, and the military.

The services and embodiments provided by the remote monitoring center 108 and described herein are powered by an intelligent security assessment algorithm which synthesizes various data inputs to provide a security assessment of a user, environment, or situation. The security assessment algorithm, named the Victor Algorithm, utilizes data from the user and user device, such as location coordinates, path and speed of travel, past movement history and patterns, temperature and sounds (i.e. irregular noises) from the user's surroundings, and images and video of the user's surroundings. Furthermore, the Algorithm utilizes third-party data such as crime statistics, traffic patterns (vehicle, aircraft, and human), crime cycles, weather patterns, gang-activity, etc. The Algorithm also utilizes in-house data such as user routines and behaviors, vulnerability of people and assets, and data from other users of the security network collected over time. All of this information is correlated to obtain a security assessment for the user and for response.

For example, consider the following scenario: A user is traveling on foot in a deserted downtown area at 2:00 AM on a weekday. This may or may not be an abnormal situation based on data processed by the Algorithm. The Algorithm may determine that this part of downtown is not a typical pedestrian area, based on historical foot traffic statistics. The Algorithm may also determine that this particular area of downtown has an increased crime rate between the hours of midnight and 5:00 AM based on crime statistics. Furthermore, the Algorithm may determine that the user did not previously advise the remote monitoring center 108 that they will be in downtown on this particular evening, and that the user usually reports any planned activities to the center 108. Thus, the Algorithm will determine that the user is in a high risk situation, and the center 108 will take appropriate action to determine if the user needs assistance.

On the other hand, if the Algorithm determines that the user works in downtown and frequently leaves their office after midnight, and the user's account does not indicate any unusual activity for this time of night during the week (such as previously reported incidents), then the Algorithm may determine that the user is not in a high risk situation. However, if there has been reported perpetrator activity recently in that area (i.e. earlier that night or day, based on real-time data from local law enforcement agencies), the Algorithm will escalate the security assessment and advise the center 108 to, for example, check-in with the user and advise them to take caution and be aware of their surroundings. As described herein, a perpetrator can be any individual, entity, group, or animal which may be suspicious, threatening, or malicious to the user, or which is committing a crime or suspected of committing a crime.

In an embodiment, the remote monitoring center 108 is staffed by one or more dispatch operators 120 and includes a communication and dispatch system 122 which may include a telephone system, one or more data modems, a computer system, and one or more display consoles. The communication and dispatch system 122 comprises means to store and access communications information, a user database, an emergency services database, map display information, and unit identifier and alarm status display information. The communication and dispatch system 122 further comprises one or more data-to-voice switches and has remote activation capability, plotting Algorithms, boundary monitoring alarm features, and the capability to store and retrieve historical data as well as data related to the user 100 or the personal safety device 102. In a preferred embodiment, display console displays the alarm signal origination location, the user identification, and an alarm code, as described in more detail in FIG. 2 below. A number of suitable map programs incorporating many of these features are commercially available and suitable for use with the present invention.

Figure 2:
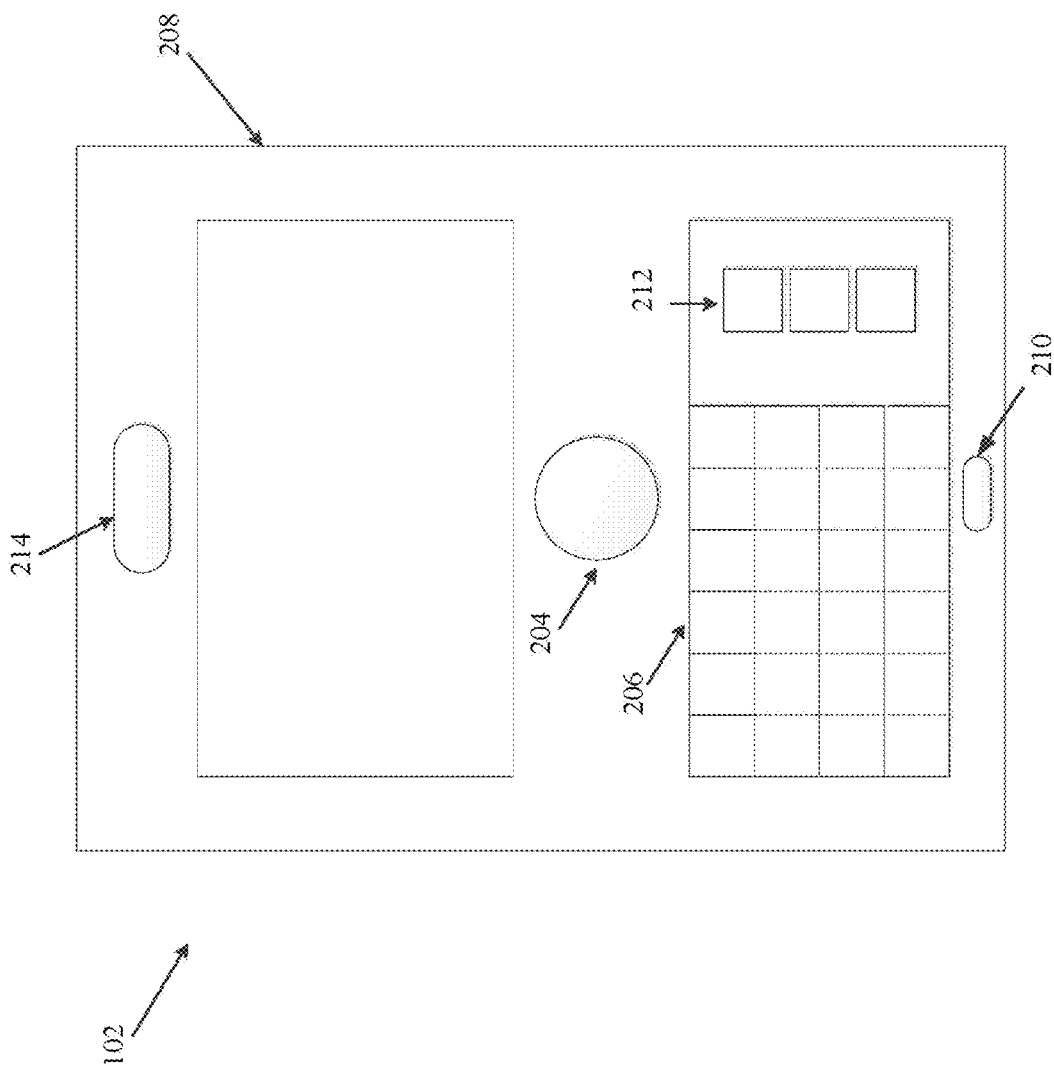
FIG. 2 is an exemplary illustration of a personal safety device in accordance with an embodiment of the present invention.

FIG. 2 is an exemplary illustration of a personal safety device in accordance with an embodiment of the present invention. A personal safety device 102 in one embodiment can be hand-held and/or wearable with a form factor similar to that of a portable electronic device such as (but not limited to) a cellular phone, digital music player or digital camera. In one embodiment, the housing is a special color that warns perpetrators of its special purpose. A GPS receiver or other geographic location determination device (e.g., GSM transceiver) is integrated with the personal safety device 102 and can be used to determine the location, speed and direction of travel of a personal safety device 102 user.

The personal safety device 102 includes a display (e.g., liquid crystal, light emitting diode, plasma, or other suitable display) which can be used to display status information and messages. By way of a non-limiting example, status information could include location information, battery life, an indication of whether or not the personal safety device 102 is within range of a receiver, paging/e-mail messages, caller identification, music selections, images, games, and information entered from keypad 206.

The keypad 206 (e.g., numeric or alphanumeric) can be used to place phone calls, send pager/e-mail messages, play games, and otherwise allow a user to interact with the device. The keypad can be a full QWERTY keyboard or a standard 10-key numeric keypad. Specialized ergonomic controls to operate integrated modules such as a camera, a digital music player, game player, and/or cellular phone can be located on the keypad or elsewhere on the device and are fully within the scope and spirit of the present disclosure.

In an embodiment, special signaling keys 212 are positioned on the personal safety device 102. The signaling keys 212 are each specific to a different service provide, such as, but not limited to, police departments, EMS providers, fire and rescue departments, private security providers 116, and 911 emergency centers 118. Thus, the user 100 has a one-touch access to send an alarm signal to a specific provider.

In another embodiment, signaling can be activated by sensors specifically tuned to recognize extreme stress consistent with a physiological or chemical reaction to a situation, or to recognize a medical crisis, such as, for example, low blood sugar, heart arrhythmias, los oxygen saturation, or no pulse. This embodiment requires the device 102 to be equipped with the appropriate body sensors to be coupled to the user.

In another embodiment, the device 102 is communicatively coupled to a transmitter that is worn on the user's body or placed in their pocket, such as jewelry, a key fob, etc. When the device 102 is physically out of range of the transmitter, a signal is transmitted to the remote monitoring center or other third-party location. This embodiment can detect a theft, such as a theft of a purse or other item in which the device 102 is placed or attached to.

Furthermore, the personal safety device 102 includes a panic button 204, which can be button, switch, or other-touch sensitive device can be used to activate a safety feature of the personal safety device 102. By way of a non-limiting example, the user can depress the panic button 104 once to begin recording sound through microphone 210 and optionally begin recording still or moving images (e.g., MPEG-4) through a digital camera having lens 214. If the user believes that they may be in danger, additionally pressing the panic button 104 one or more times in succession can activate an emergency channel wherein the user's current location, speed, direction of travel and some or all of the collected sound and/or image information can be transmitted (e.g., as one or more data packets on a mobile telephone, such as a cellular telephone, a mobile telephone network or a mobile LAN or other wireless network as described above) from the personal safety device 102 to a remote monitoring center 108 wherein help can be automatically summoned on behalf of the user 100. In another embodiment, the button 203 can be depressed to begin sending automatic data feeds, such as video, voice, image still feeds, etc., to the remote monitoring center 108 so that the dispatch operator 10 can listen in, monitor, view the situation, and also take control of the device 102 if necessary.

In yet another embodiment, the button may not be physical ergonomic button, but rather a software-based visual button a touch-sensitive screen. For example, the visual button could be an icon on the screen, similar to an iPhone or Blackberry application.

In another embodiment, the panic feature can be activated with a voice command or by a sound, or by applying pressure to the surface of the personal safety device 102. For example, the personal safety device 102 can be programmed to automatically send an alarm signal to the remote monitoring center 108 upon the user saying a particular word or panic phrase. The personal safety device 102 can include voice recognition software so that only a registered user's voice can activate the panic feature. In another embodiment, a family may choose to register the voices of all family members (e.g. parents, children, elderly grandparents) into the personal safety device 102 so that it can be activated by numerous family members.

In another embodiment, the personal safety device 102 includes a touch sensitive case 208 that can activate the panic feature upon application of a certain amount of pressure. When the user 100 exerts pressure in excess of a threshold amount, the panic feature is activated. This feature is especially useful in situations where the user 100 cannot speak or make sounds.

In another embodiment, the personal safety device 102 includes a "911-On-Call" button which, when pressed, does not contact 911 or another agency but will do so if released without turning it off. Upon feeling uncertain or uneasy about a particular environment or situation, the user 100 can depress the 911-On-Call button. A signal is transmitted to the remote monitoring center 108. A dispatch operator 120 can then monitor the user 100 and can provide assistance if the 911-On-Call button is released. Thus, if the user 100 releases the 911-On-Call button, or if the device 102 is knocked from the user's grip, the dispatch operator 120 is prompted to provide assistance, and/or an emergency service provider or 911 is contacted automatically.

It will be appreciated that the present disclosure is not limited to any one particular method of activating the panic feature of the personal safety device 102. In one embodiment, the information can be encrypted and/or compressed prior to or during transmission. If the personal safety device 102 cannot reach the communication system 104 or the remote monitoring center 108 due to its being out of range or for some other reason, the personal safety device 102 will buffer the information and transmit the alarm signal once it is able to establish contact with the communication system 104. The device may also transmit to any other devices, such as other user devices on the security network, which may be located in the vicinity of the user 100 to transmit alarms, alerts or data, image or video captures for storage.

In another embodiment, the personal safety device 102 can include a biometric identification device that can be used to authenticate its user. In one embodiment, the biometric identification device can be integrated into the panic button 204 or voice recognition system. Such biometric sensing devices can include, but are not limited to, finger print detection, voice recognition, retinal scanning (e.g., via the camera lens), blood or saliva analysis, facial feature analysis, vein analysis, and other suitable automated methods of recognizing a person. It will be appreciated by those of skill in the art that many more biometric identification methods which are not discussed herein are nonetheless fully within the scope and spirit of the present disclosure. In one embodiment, an offender may be required by their probation officer to periodically perform biometric identification to ensure that the offender has the device on their person. In another embodiment, a blind date or new business acquaintance may be asked to provide biometric information or personal information. Alternatively, a photo or video of an individual, a vehicle, a building, a place, etc. may be taken and sent back to the OC. This would be useful as a deterrent, to help find a missing person, for later identification of parties in a lawsuit or criminal act, and for other purposes.

In another embodiment, the personal safety device 102 can be integrated with other devices/form factors such as wristwatches, digital cameras, digital music players, PDAs, Pocket PCs or other suitable devices. In yet another embodiment, the personal safety device 102 can be integrated into a self-defense weapon. By way of a non-limiting example, the personal safety device 102 can be incorporated into a conducted energy weapon such as a stun gun or Taser, available from Taser International, Inc. of Scottsdale, Ariz. In such an embodiment, the panic button 204 could be ergonomically located on the weapon handle or integrated with the trigger mechanism. Likewise, the digital camera lens and microphone could be positioned on the weapon's barrel so that by pointing the weapon at a perpetrator, the weapon would be able to record the perpetrator's image and voice. This would allow the user to both summon help and provide a means for self-defense.

In another embodiment, a personal safety device 102 can include one or more tamper-resistant or tamper-proof bracelets, anklets, straps or harnesses to secure the personal safety device 102 to a person. In this way, small children who might be liable to remove and lose the personal safety device 102 will be thwarted. Similarly, a perpetrator probation program can use a personal safety device 102 to track an offender's location without the risk that the offender will remove the device. In one embodiment, if the personal safety device 102 is removed, the personal safety device 102 can automatically transmit a message to a relay to a remote monitoring center 108 indicating this event.

In an embodiment, the personal safety device 102 is an off-the-shelf smart phone or device, such as an iPhone, iPod, iPad, Blackberry, Droid, or other similar system. The off-the-shelf device can be loaded with applications or software that enables the off-the-shelf device to act as a personal safety device 102 of this invention. For example, a user can download an application from the Internet or Apple Apps Store that allows for various services to be accessed by the user. In an embodiment, the user can pay a one-time or monthly subscription fee to the security provider to gain access to the downloadable applications. Alternatively, the user can download the applications for free, and receive a limited-time or limited-feature access to try the security services. The user must then purchase a subscription to "unlock" the full capabilities and have access to the full range of security services provided.

In an embodiment, the security services are grouped into four phases or levels of service. In Phase One, the user can access via the portable safety device 102 a "Tips & Information" service, "Direct Dial 911", and "Sleeper 911". The "Tips & Information" service provides the user with critical information which may be helpful during an emergency situation. For example, if the user is in an unknown location, the "Tips & Information" service can provide a guided GPS path to the nearest police station, gas station, or public place. The "Tips & Information" service may also provide data from law enforcement networks as to crime activity and levels in an area. For example, if the user is planning a jogging route in an unknown area, the "Tips & Information" service can provide information as to how safe a particular area is based on historical crime data, and can recommend safer jogging routes.

The GPS path information can mark the user's location prior to entering a potentially hazardous or unknown area, such as a wilderness area, a low cellular reception area, or any other location where a "last known" point would be useful to the user 100 for navigational and/or escape route purposes.

In another embodiment, the GPS marking can alert the remote monitoring center 108 that the user is entering a potentially dangerous location, and the remote monitoring center 108 can respond accordingly by providing enhanced monitoring to the user 100.

Another Phase One service is "Direct Dial 911", where a single touch on the portable safety device 102 connects the user to a 911 emergency service and/or to the remote monitoring center 108. The single touch can also connect the device 102 to both a 911 emergency service and the remote monitoring center 108. In addition, the single touch can also transmit messages, such as SMS, MMS, or e-mails, to pre-designated recipients, such as family members, neighbors, or friends. The "Direct Dial 911" activation can occur by touching on a particular area of the screen, entering a particular key or combination of keys, touching a pressure sensitive area such as the top of bottom of the device 102, or by squeezing the device 102 from opposing sides. If the device 102 has a touch-sensitive screen, such as on an iPhone, then the user can enter a specific user-defined gesture which activates the "Direct Dial 911" service. In yet another embodiment, the device 102 can have speech recognition, and the user can activate "Direct Dial 911" by speaking an activation word or phrase, such as "911" or "Emergency". The activation word can also be an unassuming word that will not alert a potential perpetrator that the user is contacting assistance, such as "call Amis".

In another embodiment, the device 102 can be motion activated. For example, various motions done by the user can activate different features of the device. Moving the device 102 in a circle slowly three times can initiate an alarm signal to the remote monitoring center 108, whereas quickly tilting the device 108 from left to right in rapid succession could activate a video camera and send a data feed to the remote monitoring center 108. In this embodiment, the device 102 may include accelerometers and other motion sensors similar to those found in the hand-held controllers for the Nintendo Wii system.

Another Phase One service is "Sleeper 911", where the device 102 is set to automatically call a 911 emergency service and/or the remote monitoring center 108 at various interval times, such as 10, 30, or 60 minute. This feature is useful if the user is in a potentially dangerous situation, and the remote monitoring center 108 can keep constant communication with the user, without the user having to retrieve the device 102 and visibly dial for assistance. In an embodiment, once the "Sleeper 911" feature connects the device 102 to the remote monitoring center 108, a dispatch operator 120 can simply listen to the environment or surroundings, and take appropriate action when necessary to escalate assistance services. After a predetermined amount of time, such as one minute, the dispatch operator 120 can disengage the call, or alternatively, the dispatch operator 120 can remain on the call until the user presses a button on the device 102, enter a passcode on the device 102, or speaks a passphrase to indicate that they are safe. The dispatch operator can also contact other cell phones in the area that may be part of the security network, i.e., either clients, volunteers, or employees, who can then check on the status of the user 100 or provide additional localization information to the remote monitoring center 108 and/or emergency responders In Phase Two, users can access via the portable safety device 102 a "Check-In" service, "GPS Track & Log" feature, "Speaker On" function, "My Friends Network", "Personal Guard", and "Date Safe". In the "Check-In" service, the user schedules times with the remote monitoring center 108 when the user will either call, send a text message (SMS or MMS), or otherwise transmit a signal to the center 108 via the device 102. If the center 108 does not receive the scheduled communication from the user, a dispatch operator 120, or a center supervisor, or a computer calls or otherwise contacts the user directly. If the user does not answer or reply, the center 108 will contact a 911 emergency service and provide the device's GPS coordinates and/or physical location, or will take other action such as alerting private security personnel, family members, friends, volunteer groups or individuals within the security network, whether they are customers, volunteers, or employees.

The "GPS Track & Log" feature allows the user to activate GPS tracking on their device 102, which enables the center 108 to track the user's movements and route during a specific time period. In an embodiment, GPS tracking is always active and the device is constantly being tracked and its movements logged by the center 108. However, the user may selectively disengage and engage tracking at their will. In another embodiment, when the user enters a known dangerous area, based on, for example, historical crime data, or recent emergency situations encountered by other users on the security network, the GPS tracking feature is automatically turned on and the user is prevented from disengaging the GPS tracking.

In another embodiment, the system may be employed to monitor the travel and movement habits of a user and compare this information to current movement patterns or locations in order to determine an appropriate security level assessment. For example, if the user suddenly starts to run after a period of walking or slow movements, this may indicate that the user is in potential danger.

The "Speaker On" feature automatically connects the device 102 to the remote monitoring center 108 so that the dispatch operator 120 can listen to the user's surroundings and environment, as well as speak to the user or to the surroundings via the speaker in the device 102. The "Speaker On" feature can be activated by speaking an activation word, touching a particular part of the device 102, or pressing a button or combination of buttons on the device 102. Once activated, the dispatch operator 120 can warn any potential perpetrators or intruders in the vicinity that the user is being monitored, that assistance or law enforcement is on the way, that the surroundings are being videotaped in real-time, that evidence is being collected and/or anything which may positively alter the outcome of the intended crime such as delaying or thwarting it.

In another embodiment, the "Speaker On" may also be activated by the remote monitoring center 108 if the center 108 determines that the user 100 may require such assistance. Certain sounds may be delivered via the speaker such as music, vibrating frequencies, police sirens, barking dogs, shouting people, and other which are known or will soon be known to affect the outcome of a crime, to distract or affect the perpetrator, to provide a calming influence to the user, and/or to irritate the perpetrator, etc.

The "My Friends Network" allows the user to designate certain friends and family members who can also be tracked by the center 108 with permission. For example, the user may designate up to five persons for no additional fee, and then must pay a fee for each additional person that they would like tracked by the center 108. The persons in the "My Friends Network" are automatically provided assistance via the center 108 if they encounter a threat, similar to the response given to the user. However, the "My Friends Network" may not have access to the full range of services that are available to the subscribing user.

The "My Friends Network II" allows the user to designate certain friends and family members who will be alerted if the user sends a distress or, depending on the option they choose, any kind of message such as the "last known location" or a "sleeper 911".

"Virtual Guard" is an advice service where the user can call in, send a text message, email, or otherwise interact through the Internet with the center 108 to receive information regarding safety, security, and the law. Interacting through the Internet can include online chatting, or receiving static information from web pages. "Virtual Guard" is useful in situations where the user is hesitant to call a 911 emergency service, but does have some feeling of threat, apprehension, or danger. Furthermore, the "Virtual Guard" feature is also useful if the user wishes to know how something works or operates, such as how long the night lights stay on at a public park or how late If the center 108 deems the user's situation potentially dangerous, the center 108 will connect the user to a 911 emergency service, or alternatively request that the user do so themselves.

"Date Safe" is a service which recommends safe meeting places that have been approved by the center 108, or are known as "friendly" locations by the center 108. "Date Safe" is useful for users preparing for a first date, or for meeting for other reasons such as gathering at a restaurant, bar, or other public place. Users can be confident that they will be in a monitored location that is known to the center 108, and which may have Spartan volunteers nearby (described below).

In Phase Three, user can access via the portable safety device 102 the "Spartan & Witness Network", a "Pre-Screen" service, and "Pix Safe". The "Spartan & Witness Network" is a group of volunteer individuals who are trained in providing assistance to a user. These individuals are tracked by GPS on their own devices, and are alerted by the center 108 or by the users themselves when a proximate user needs assistance. These individuals can crowd a location, thereby thwarting a potential attack on a user, provide physical assistance to a user, or participate in search and rescue for missing children, persons, etc. These individuals can also record images, video, and/or sound of a scene that is transmitted to the center 108. In addition, professional security officers, off-duty law enforcement personnel, and other professional first responders can be part of the network, and they may be paid or unpaid.

In another embodiment, these individuals' devices could be used for location-determining purposes in the event that the position of the user or user device cannot be located. For example, the GPS coordinates of the multiple individuals' devices can be triangulated to provide a proximate location of the user.

The "Pre-Screen" service allows a user to quickly conduct a background check on an individual via their device 102. The user can enter as much information as known about an individual, such as name, aliases, address, social security number, date of birth, license plate number, etc., and this information is transmitted to the center 108. The center 108 conducts a background check for perpetrator activity and notifies the user if any concerning information is uncovered. In an embodiment, the user can enter this information on an individual, and receive an indication from the center 108 within minutes as to the perpetrator history of the person. If there is concerning information, the device 102 can vibrate or otherwise signal the user to be suspicious or careful. This way, the user does not have to visibly access their device 102. In another embodiment, the center 108 calls the user or sends a text message or email to the device 102 with the results of the perpetrator background check.

The "pre-screen" service also allows a user to record events, persons, scenes, etc. and provide valuable information that may be used in the investigation of a crime, in the search for a kidnapping victim or missing person. Collection of this information also warns the potential perpetrator that they have been recorded and that the monitoring service is aware of them and has locatable information such as their name, birth date, vehicle license number, home address, business name, etc.

"Pix Safe" allows the user to take a photograph, video, and/or sound recording of an event, scene, person, license plate, etc. and transmit this data to the center 108 for safekeeping. The center 108 stores the received images, video footage, and sound recordings, which can then be retrieved by law enforcement or others during an investigation into perpetrator activity. This information can also be used by the center and/or other appropriate organizations or individuals to locate a missing person, to provide information that will secure the safety of the user or of others, etc. Specifically, the collection of this information may be used to locate and assist a user in distress, as well as track down and prosecute a perpetrator after an incident occurs.

In Phase Four, users can access via the portable safety device 102 the "911 Direct Locator" and "Search Services". The "911 Direct Locator" allows the user to transmit enhanced location information to the center 108 or to a 911 emergency service. This enhanced location information includes not only GPS coordinates, but also information collected from nearby WiFi hotspots, RFID sensors, Bluetooth sensors, and other short-range communication protocols. This information can include the name of nearby businesses that are transmitting WiFi or other communication signals. In another embodiment, the GPS coordinates, along with the location of various WiFi hotspots can be used to triangulate the precise location of a user. In yet another embodiment, images and/or video footage of the user's surrounding environment is automatically transmitted to the center 108 or the 911 emergency service.

"Search Services" allows the user to provide information regarding a missing person, such as a loved one, to the center 108. The center 108 then actively conducts a missing person's investigation using law enforcement and other third-party databases. In addition, the center 108 continually searches its own network of users and internal databases. For example, if the center 108 has a picture of the missing person, the center 108 can compare the picture to its image and video databases (comprises of data sent it from users on its security network), and can conduct facial recognition as part of its investigation. This service can also be used to search for missing pets, vehicles, and other property.

In another embodiment, users, volunteers and paid professionals may be a part of the network and actively facilitate locating missing children or other wanted persons by providing photographic and other information of people in their area. A user, volunteer or paid professional may simply stand near a high traffic area where a wanted or missing person is thought to be and record images and other information that can then be analyzed and cross-referenced with databases and other search information in order to help locate someone. The remote monitoring center 108 can also organize search parties from Spartans, users, other volunteer groups, as well as with targeted advertising for short term volunteer parties for searches, disaster relief and other emergency type activities.

The above services and phases can be combined into various service suites. Users can combine the most relevant services to meet their security needs, thereby providing a highly effective security service for the user. For example, the following suites are provided for illustration purposes:

(1) Home Alone—For users who are often home alone, children, and the elderly. This suite includes "Check-In", "Speaker On", and "Personal Guard".
(2) Domestic Safe—For users in abusive or potentially abusive domestic relationship. This suite includes "GPS Tracking", "Direct Dial 911", and "Auto Recorder" and "Panic Button"
(3) Child Safe—For parents who want to track their children daily with "GPS Tracking", "Check-In", "Victor for Children", and "Kid's Network".
(4) College Safe—For parents who wish to provide certain security services for their college-bound children: "Date Safe", "Virtual Bodyguard" and "On-Call 911".
(5) Elder Safe—For children or caregivers who wish to provide certain security services for their elderly parents, such as "Check-In" and "Speaker On".

The suites described above can be customized for a variety of applications, industries, occupations, and individuals. Below are some exemplary examples of specific applications of the security network:

Safety Network for Real Estate Agents. For example, real estate agencies can have their own local security network that would operate from an in-house computer or from the remote monitoring center 108, track the locations of their agents, as well as using the Algorithm to determine relative safety levels. At the end of each appointment, the agents can signal the remote monitoring center 108 that they are safe and are moving on to their next appointment.

Safety Network for Children. For example, a group of children could have a security network wherein they pay attention to each other's location, perhaps when going to a football game together, and if any of the children leave the football game, not only would the children's safety levels change along with alerts, but a supervisory member, such as an adult, would also be alerted. In another embodiment, an automated notification is sent to a parent, legal guardian, first responder, and/or caretaker when a relative safety level of a child changes, for example, if a predetermined route is not followed when a child is walking home from school. Such notifications can aid in preventing or responding to a kidnapping or abduction.

Safety Network for Families. For example, parents can have an arrangement with their children to follow a particular path when returning from school and this deviation would affect the safety level. They could also "attach" all of their children when going to the local park. If any of the children strays more than 25 meters from any other, the safety level is affected, possibly resulting in a ping, alert, or notification from the remote monitoring center 108 to the supervisory adult or to the other children.

Safety Network for Dating. For example, ten single dating women could agree to form their own network and then be apprised when anyone one of them goes on a date, is not home at a pre-arranged time, is not where they are supposed to be, etc. These women might have pre-arranged ways of knowing when to contact each other or how, or they may use a combination of features described herein in addition to their unique network features. In another embodiment, the safety network can provide a collection of on-demand safety videos giving examples, training, and ideas for a particular situation, such as a perpetrator threatening violence, an assault in progress, or locating a missing child. These videos and other useful information would be available to a user through their personal safety device at any time, such as prior to entering into a potentially threatening situation (e.g., a individual on a date going bad could retreat to the bathroom and watch a safety video on "leaving a date which has become uncomfortable but is in a private location" or receive advice from a dispatch operator on the safest or most discreet escape routes). These videos would allow a user to make a decision on a particular situation that may not be currently dangerous, and which may not yet warrant a 911 call or other drastic action, however, support is needed to improve the safety level of the user.

In another embodiment, a single dating woman may specifically tell remote monitoring center that she is going on a date and will be back by 10:00 pm. She may make 10:00 pm a "hard" date which means any and all actions should be taken to find her if she is not home or contactable at that time. She may also provide the name, license plate number, and address or how she met her date, thus providing information that could be used to investigate a crime but also providing a deterrent effect. During her date she may enter a dangerous neighborhood and the remote monitoring center will alert her to that fact by raising her safety assessment, for example. Following this, either she or the system may take follow-on measures. Finally, the remote monitoring center may initiate action for a number of reasons, such as becoming aware of a hurricane entering the area or upon finding additional information on her date, or because her movement is inconsistent with the understood plan for the date.

Security Network for Police Officers. For example, police officers often call in their location prior to beginning a contact with the public, the remote monitoring center 108 could be notified of their location or the fact that they have arrived by using a portable safety device instead of the radio. The security network would also make it easy for officers to know the location of other officers, of suspects in certain situations, and of relevant facilities or vehicles, such as an ambulance or hazmat team. This service may be provided by license through a 911 center rather than through the remote monitoring center 108.

Security Network for Military Use. For example, while soldiers may be considered to be in harm's way during any combat tour, there are relative levels and times of danger. The security network can provide information about when a relative threat is higher, such as when combat operations are occurring nearby but out of sight and sound or when a known group of hostiles is approaching. Utilizing the Algorithm, as well as battlefield and other information, supplied from both civilian and military data sources (i.e., intelligence and satellite imagery databases), soldiers can be warned when the threat level has suddenly increased. In another embodiment, the security network can be utilized on a larger scale and can be used to provide relative levels of danger and safety to entire squadrons, battalions, and quadrants.

Safety Network for Medical Use. For example, if a group of individuals were trapped during an earthquake and needed medical help, a physician or health care provider can access information provided by the security network to assess the needs of individuals and/or to perform a triage helping first responders make resource decisions accordingly. This information can include, for example, pre-existing health conditions of the user, drug interactions and allergies, and next of kin information.

Security Network for Court Order Compliance Tracking For example, the security network can receive data from court-required tracking devices on targets of restraining orders, child molesters, sex offenders and other individuals that are not allowed near the user. The system would identify when such an individual is near the user and increase the danger level signal, pinging, alerting, or notifying the user or remote monitoring center of non-compliance and potential threats.

As can be seen the security and safety networks described herein can be utilized for virtually any type of situation or individual that requires safety monitoring and assistance. This can include, but is not limited to, substance and behavioral treatment groups, clubs, industry organizations, professional associations, government entities, businesses, citizen and neighborhood patrols, volunteer associations, search and rescue teams, delivery drivers, postal workers, federal agents, teachers, students, security personnel, outing groups (i.e., Boy Scouts or Girl Scouts, etc.), campers, travelers, and disaster relief personnel.

The described networks can be provided to and customized for virtually any group that wants to be safer and can rely on each other to provide some part of their safety system. This might include treatment groups, clubs, industry groups, professional associations, government entities, businesses, citizen patrols, and volunteer associations.

In an embodiment, the safety network can monitor driving characteristics of the user. For example, a safety monitoring device can be integrated within a vehicle, and can transmit data such as speed, braking force, acceleration, deceleration, and stationary periods to the remote monitoring center. The remote monitoring center can use this information when monitoring a user on the way to a location (work, school, etc.), leaving a location (work, school, etc.), getting into a vehicle, going above or below a certain speed limit, driving on a public or private street, and driving off-road. This information can be incorporated by the Algorithm to provide enhanced safety assessments of the user while they are in a moving vehicle.

Figure 3:
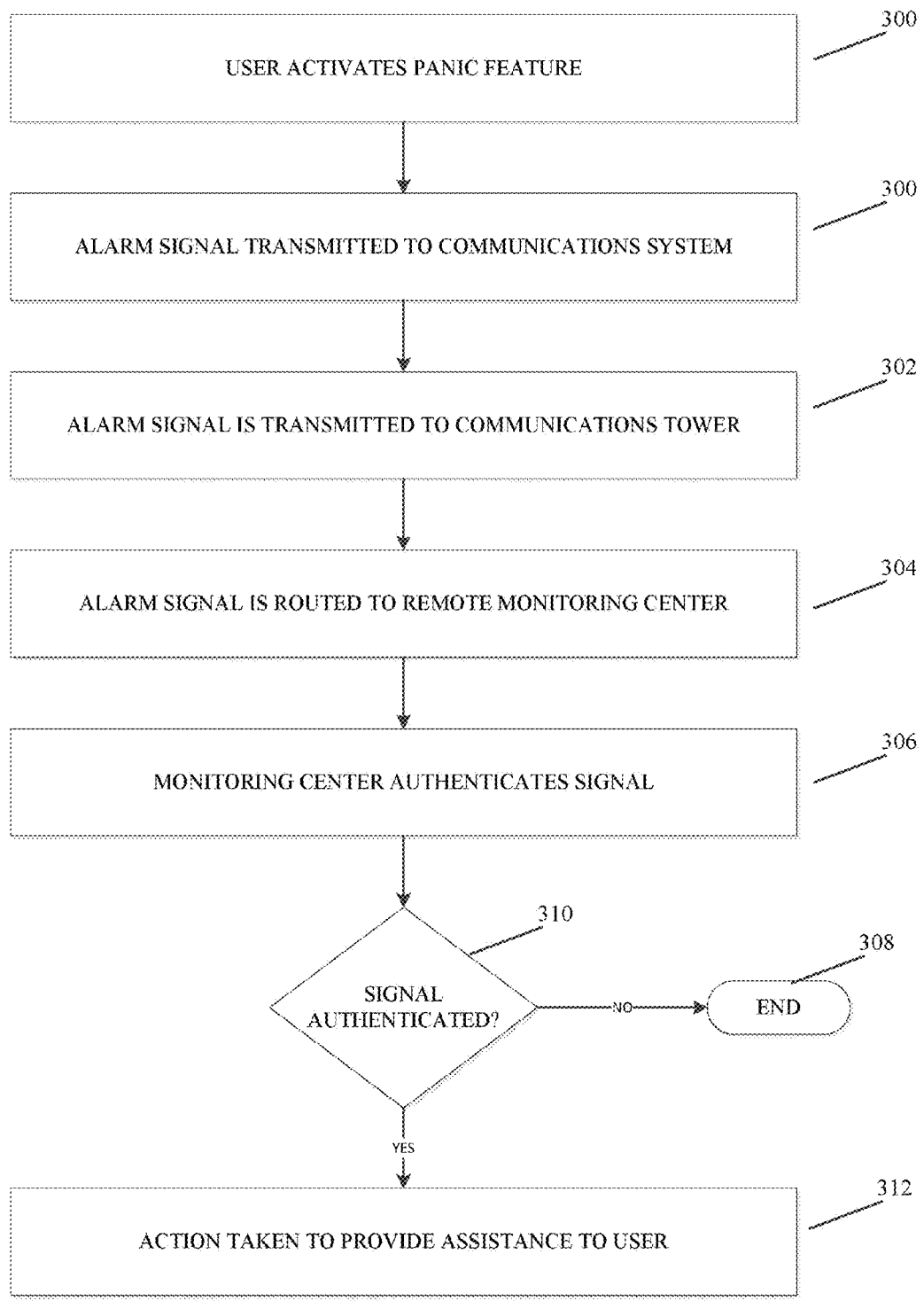
FIG. 3 is a flowchart illustrating the steps of providing assistance to a user in accordance with an embodiment of the present invention.

FIG. 3 is a flowchart illustrating the steps of providing assistance to a user in accordance with an embodiment of the present invention. Once a user 100 activates the panic feature of a personal safety device 102 in step 300, the personal safety device 102 transmits information including the individual's location to a communication system 104 in step 302 as described above.

After activation of one or more personal safety devices 102, an alarm signal is transmitted to one or more communication systems 104 in step 302 via one or more public or private networks. By way of a non-limiting example, a network can include one or more of satellite, cellular (e.g., CDMA, GSM, UMTS), local area wireless (e.g., Wi-Fi), Ethernet, token ring, Internet and ATM networks. In one embodiment, the communication system 104 can associate the transmitted location, speed, direction of travel, of the personal safety device 102, as well as the sound/image/video/movie information with time stamps and/or electronic signatures personal safety device 102 in order to provide a tamper-proof record of the information.

In another embodiment, the communication system 104 can be integrated into a network access point, such as a cellar base station, satellite uplink, or point-of-presence, such that personal safety device 102 information is made tamper-proof before it enters a network at large. Multiple communication systems 104 can be organized in clusters or grids to provide automatic load balancing and fail-over as is well known in the art wherein if one communication system fails or is busy, a second communication system can pick up where the first one left off. The communication systems can share a database management system (DBMS) to persist the information received from personal safety device 102.

In step 304, the alarm signal is transmitted from the communications system 104 to a communication tower 106 that is within the closest proximity to the GPS coordinates of the portable safety device 102. In an embodiment, the communication system 104 compares the GPS coordinates from the portable safety device 102 with the coordinates of various communication towers stored in a database (either locally on the communications system 104 or remotely).

Next, in step 306, the alarm signal is routed from the communication tower 106 to a remote monitoring center 108. In an embodiment, the remote monitoring center 108 determines at step 310 if the alarm signal has been sent from an authentic or registered user or personal safety device. In embodiment, the alarm signal may be encrypted, and requires a decryption key that is located on the communication and dispatch system 122 at the remote monitoring center 108. In another embodiment, the alarm signal can include identification information from the user 100 and/or the personal safety device 102 that can be compared to stored information on a database located on the communication and dispatch system 122 at the remote monitoring center 108.

If the alarm signal is determined to be fraudulent, or sent from an unregistered or unverified personal safety device, the process ends and no further action is taken by the remote monitoring center 108. However, if the alarm signal is verified, then the remote monitoring center 108 initiates an appropriate response at step 312.

Figure 4:
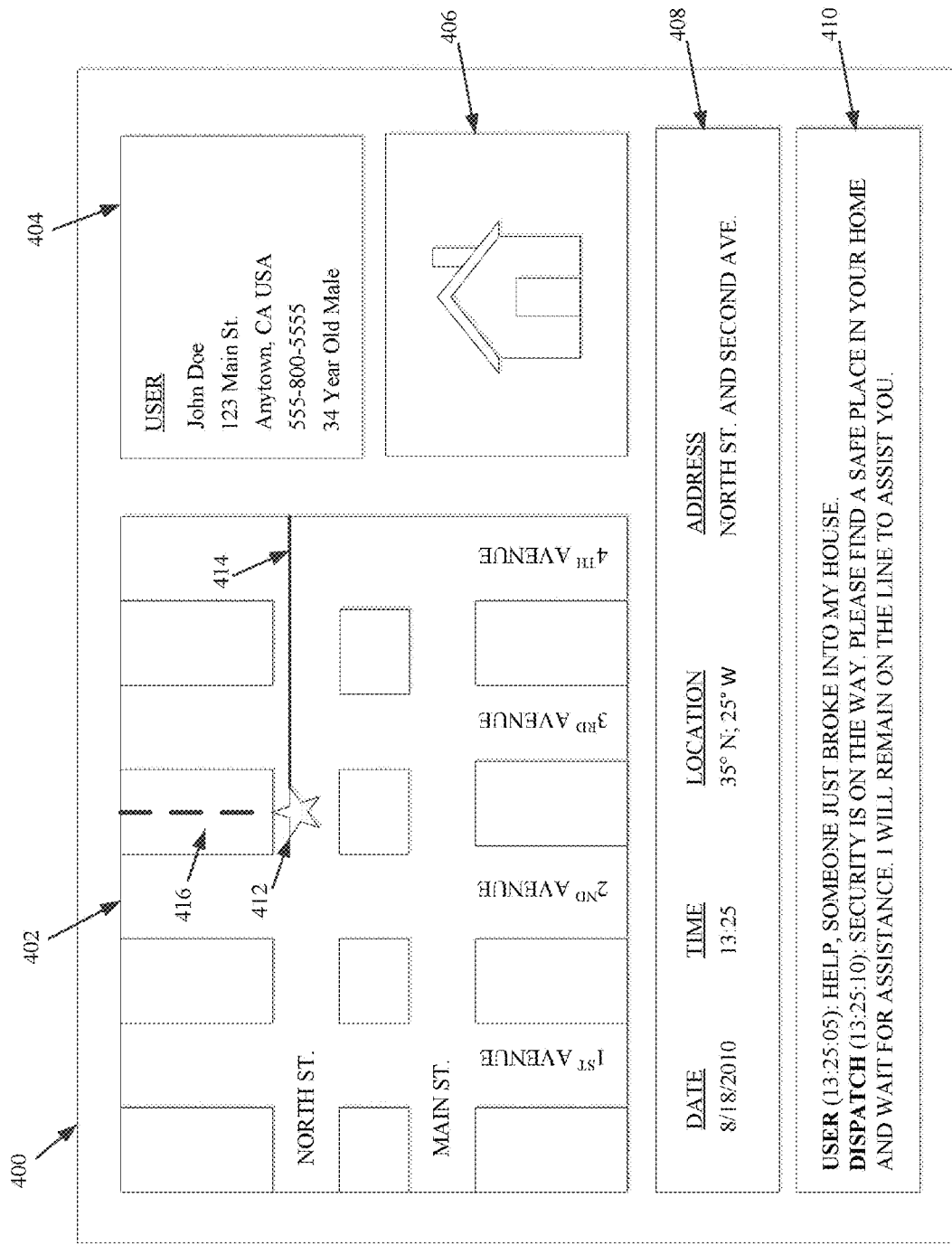
FIG. 4 is an illustration of an exemplary dispatch interface in accordance to certain embodiments of the invention.

At this stage, a dispatch operator 120 is presented with information related to the user 100 and/or the personal security device 102 as further described in FIG. 4. The dispatch operator 120 can be a trained response provider, and may be former law enforcement personnel, 911 operators, or other person with an appropriate background and training in emergency and disaster response.

The dispatch operator 120 can assist the user 100 and provide a number of services, such as patching the user 100 to an emergency response provider, and staying on the call with the user 100 until help has arrived at the user's location. Furthermore, the dispatch operator 120 can act as a go-between the user 100 and a 911 center in the event that the user 100 is uncomfortable with directly dialing 911 in the absence of a certain emergency or a threat. In another embodiment, the dispatch operator 120 can be patched directly to a speaker on the personal safety device 102 and can announce that emergency response is on the way to the user's location. This may help in deterring any real or potential threats, such as burglars, intruders, and perpetrators that may be in the vicinity of the user.

In one embodiment, the communication and dispatch system 122 can allow interaction with a personal safety device 102 user through one or more communication channels. This interaction can be accomplished using any number of network protocols and data formats, including but not limited to IP, UDP, TCP/IP, HTTP, HTTPS, POP, VoIP, SOAP, XML, or any other suitable standard or non-standard format/protocol. In one embodiment, a "Contact" button allows a text, voice or video message to be sent to a personal safety device 102. A "Send Help" button allows the dispatch operator 120 to issue a command to dispatch emergency services to the user 100. Finally, the "Configure" button allows commands to be sent to a personal safety device 102. By way of a non-limiting example, such commands can include the ability to remotely unlock a tamper-resistant or tamper-proof bracelet or anklet that secures the personal safety device 102 to a user, the ability to remotely enable/disable the personal safety device 102 "Panic" button, and the ability to remotely enable/disable any other features of the personal safety device 102.

In addition, the dispatch operator 120 can activate the camera 214 on the personal safety device 102 and is able to see the scene at the user's location. In another embodiment, the communication and dispatch system 122 can record any images and video transmitted from the personal safety device 102 so that this evidence can be reviewed and analyzed by authorities if needed at a later time.

In another embodiment, the communication system 104 may be coupled to a satellite that can provide imagery that may assist in locating missing persons or fleeing perpetrators. The satellite image may be used to direct airborne support such as airplanes and helicopters to track individuals. The airborne support can itself also be used to collect images and data, and the airborne support may be unmanned reconnaissance drones.

In yet another embodiment, the communication system 104 may be coupled to a power grid that allows the system 104 to control spotlights and streetlights throughout an area, such as a metropolitan downtown location or a city park. As a perpetrator is fleeing, their movements can be tracked and lights can be turned on to illuminate their presence to overhead aircraft or to persons on the ground.

In another embodiment, upon receiving information from a personal safety device 102, the communication system 104 and/or remote monitoring center 108, in addition to contacting the emergency response systems, can also automatically contact one or more other clients (e.g., a child's parents, a friend or spouse, an employer, etc.). The notification can take many forms including, but not limited to, an electronic message sent over the one or more networks, an automated voice message sent via a telephone network or via VoIP, e-mail message, an automatically placed 911 call, a facsimile, and/or a pager message. The notification can include a user's current location, direction of travel, speed, and/or voice/image/video/movie data recorded by the personal safety device 102. This embodiment is useful if the user 100 is a child or elderly person, and a parent or guardian wishes to receive a notification when the panic feature is activated by the user 100.

In one embodiment, the notification delivery can be escalated automatically if an acknowledgement of its receipt is not received by the communications system 104 and/or remote monitoring center 108. For example, if an electronic message is sent but is not acknowledged within a certain time frame by a parent or guardian, the relay can attempt to automatically contact the parties through alternate and/or higher priority paths (e.g., via e-mail, telephone, etc.) until a confirmation that help is on the way is received.

In an embodiment, the remote monitoring center 108 continually pings, talks, or signals the device 102 to obtain critical information such as location coordinates from the device 102. In the event that the remote monitoring center 108 is unable to reach of otherwise contact the device 102, this information is used by the Algorithm to determine an appropriate response, if necessary.

FIG. 4 is an illustration of an exemplary dispatch interface in accordance to certain embodiments of the invention. The dispatch interface 400 visually depicts the path of a personal safety device 102 on a satellite or street map display 402 as well as a projected path based on the current direction and travel speed of the personal safety device 102. This allows the dispatch operator 120 to quickly ascertain where a user 100 with a personal safety device 102 is and where they might be going. In addition, the dispatch interface 400 provides the ability to playback images/movies/videos and sounds that were recorded on the personal safety device 102 at given geographic locations in the audio/visual display 406. The audio/visual display 406 can include controls for the dispatch operator 120 to pause, fast forward, rewind, slow down, or take a snapshot of the audio or visual data that is being transmitted from the personal safety device 102.

Besides providing this information, the dispatch interface 400 permits messages to be sent to the personal safety device 102 (e.g., a page or voice message) as well as configuration information which can control feature activation on the personal safety device 102. The dispatch interface 400 also has the capability of configuring escalation strategies and communicating and coordinating between various emergency response providers.

By way of a non-limiting example, the dispatch interface 400 can include one or more of the following: 1) a dispatch interface 400 (e.g., rendered with HTML); 2) an ability to respond to sounds and/or voice commands; 3) an ability to respond to input from a remote control device (e.g., a mobile communications device, such as a mobile telephone such as a cellular telephone, a PDA, or other suitable remote control); 4) an ability to respond to gestures (e.g., facial and otherwise); 5) an ability to respond to commands from a process on the same or another computing device; and 6) an ability to respond to input from a computer mouse and/or keyboard. This disclosure is not limited to any particular dispatch interface 400. Those of skill in the art will recognize that many other dispatch interface 400 embodiments are possible and fully within the scope and spirit of this disclosure.

In one embodiment, dispatch interface 400 can include a location history display 408 that contains a history of where a user has been. Each row in the list can include a date and time stamp for a location in latitude, longitude, and altitude, and the approximate street address. By default, the list can be automatically sorted so that the most recent information is at the top of the list. Selection of a row in the list can cause the location to be displayed in the map. As seen in FIG. 4, the street map display 402 shows the user's current location "*" 412, where user has been "solid line" 414, and where it is projected that the user is going "dashed line" 416. In one embodiment, the user's projected path can be based on the user's current direction, speed and prior location(s). The street map display 402 can be displayed as a street map, a satellite image, or an overlay of a street map on a satellite image. By default, a map of the user's current location is displayed and refreshed each time new location information is received by from the communication system 104. If the user 100 has activated the panic button 204, the relevant row in the location history display 408 can be displayed in red or otherwise highlighted to draw attention to it.

The dispatch interface 400 further includes a text display 410 which transcribes the communication between the user 100 and the dispatch operator 120. This text is stored in a database along with the audio/video recording as described above and can be retrieved for later review and analysis.

Furthermore, the dispatch interface 400 includes a user information display 404 which provides stored information related to the user 100. In an exemplary embodiment, the personal safety and tracking system is provided by a third-party provider, and requires users to registers for monitoring and safety services via a monthly or yearly subscription fee. When a user registers for the service, they provide the third-party provider with personal information which is then stored on a database on the communication and dispatch system 122. When an alarm signal is received from a user 100, a lookup is performed and the user's information is retrieved from the database and displayed to the dispatch operator 120 in the user information display 404.

In an embodiment, the user information display 404 can also display demographic information about the user, such as age, sex, race, height, weight, and if the user has any medical conditions. For example, the display 404 can indicate whether the user 100 is a diabetic, or handicapped. Such information can further assist the dispatch operator 120 in providing the appropriate assistance to the user 100.

Figure 5:
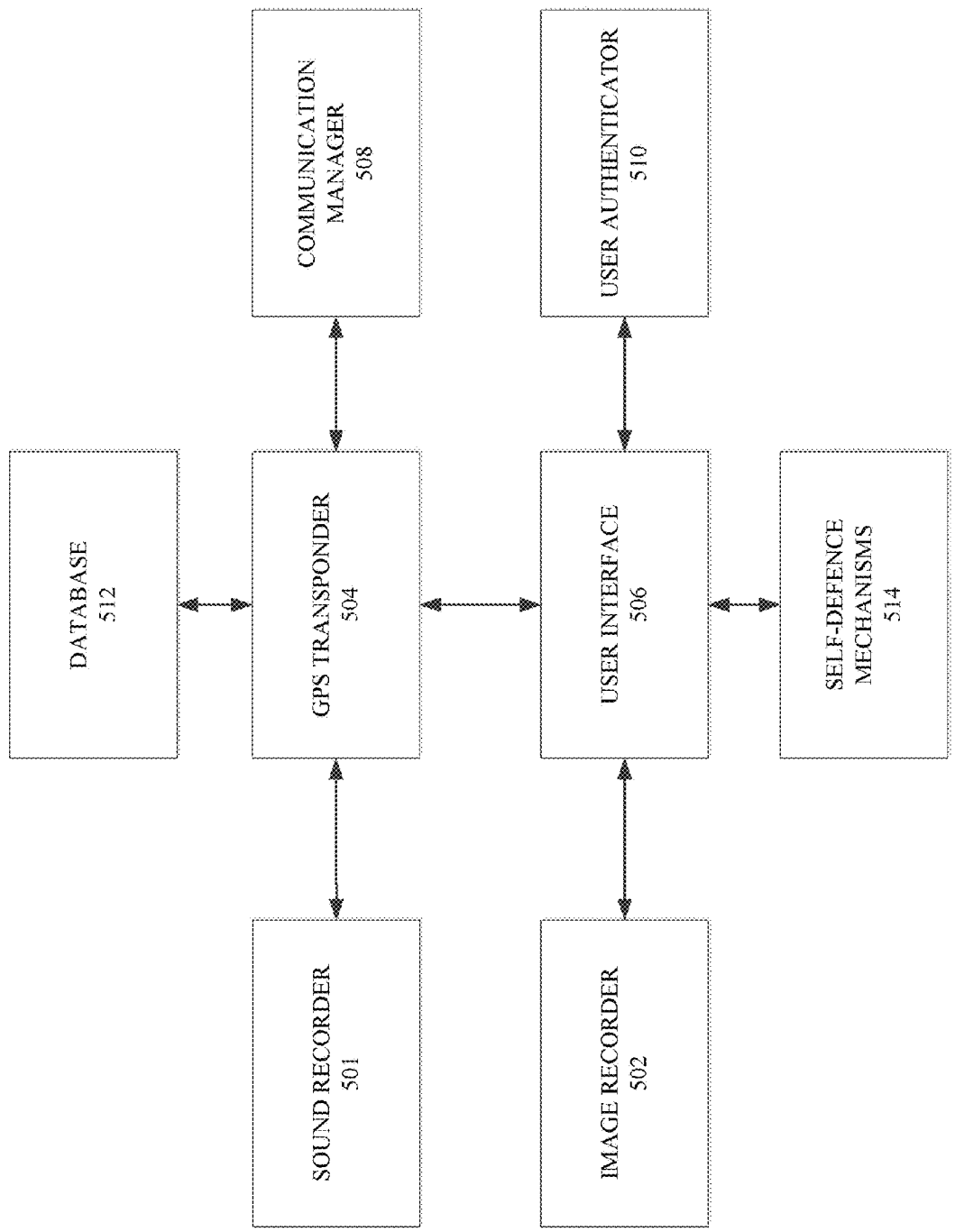
FIG. 5 is a block diagram of a personal safety device system in accordance to certain embodiments of the invention.

FIG. 5 is a block diagram of a personal safety device system in accordance to certain embodiments of the invention. Although this diagram depicts subsystems as logically separate, such depiction is merely for illustrative purposes. It will be apparent to those skilled in the art that the subsystems portrayed in this figure can be arbitrarily combined or divided into separate software, firmware and/or hardware modules. Furthermore, it will also be apparent to those skilled in the art that such modules, regardless of how they are combined or divided, can execute on the same computing device or can be distributed among different computing devices connected by one or more networks or other suitable communication means.

System 500 has an open architecture that allows for infinite expandability. The system is composed of one or more modules that implement a common communication mechanism. Component communication can be facilitated through a logical message bus or other paradigm that allows modules can send and receive asynchronous messages. In one embodiment, the message bus can be based on the JMS API available from Sun Microsystems, Inc. of San Jose, Calif. JMS is a messaging standard that allows application modules to create, send and receive messages. The message bus allows individual modules to take actions based on messages they receive and, likewise, to drive the action of other modules by sending messages. In one embodiment, a message can include a code identifying the source module of the message, the message type, and optional parameters. Such a flexible system allows for easy integration with new devices (e.g., PDAs, cell phones, music players, digital cameras, computer games) as these technologies evolve.

In one embodiment, the system 500 includes a sound recorder module 501 and image recorder module 502 that provide sound and image/movie/video recording capabilities, respectively. As with the other modules, modules 501 and 502 can provide services for capturing sound and images to other modules through a message interface. In one embodiment, the modules can store captured information in the database 512. In another embodiment, the modules can provide captured sounds/images/movies/videos in a message. Both modules can also implement hardware interfaces to allow any number of hardware devices (e.g., microphones, digital still/video cameras) to be easily plugged into the system. In another embodiment, modules 416 and 418 can be integrated into a single module.

The system includes a GPS transponder module 504 that can continuously or periodically receive location information from a compact GPS receiver or other device for determining geographic location and store said information in the database 512. In one embodiment, the database 512 can be any type of storage medium including floppy disks, optical discs, DVD, CD-ROMs, microdrive, and magneto-optical disks, ROMs, RAMs, EPROMs, EEPROMs, DRAMs, VRAMs, flash memory devices, memory stick, flash RAM, static RAM, non-volatile memory, magnetic or optical cards, nanosystems (including molecular memory ICs), or any type of media or device suitable for storing instructions and/or data.

The GPS transponder module 504 can receive messages that correspond to requests for current or historical position information and respond with the requested information. In one embodiment, the GPS transponder module 504 has a standard hardware interface, which allows any location determination device that conforms to the interface to provide location information to the system 500.

Communication manager module 508 can provide a standard interface for sending and receiving information over one or more communication mediums (e.g., cellular, satellite, Wi-Fi, pager, or other suitable medium). The communication manager module 508 can offer connected, connectionless, reliable and/or unreliable communication channels. In one embodiment, the communication manager module 508 implements a message interface that allows other modules on the message bus to access these services. By way of a non-limiting example, a module can send a message to: open a communication channel of with a given destination; send a message over the channel; register to receive a message when information is received on the channel; register to receive a message when information transmittal fails; and set transmission parameters such as retry count, message length, compression, and encryption. In one embodiment, the communication manager module 508 has a standard hardware interface, which allows any communication hardware that conforms to the interface to integrate with the communication manager module 508.

User interface module 506 can provide a standard interface for obtaining user input (e.g., keypad interaction, panic button, voice recognition, finger and hand articulation, etc.) and for providing visual, audio and other sensor output to the user. In one embodiment, the user interface module 506 implements a message interface that allows other modules on the message bus to access services related to input events and output functions. By way of a non-limiting example, a module can send a message to the user interface module 506 to register to receive input events from, for example, the keypad. Thereafter, whenever the user interface module 506 detects input from the keypad, it will send a message and any relevant data to modules that have registered to receive this input event. Likewise, a module can send a message to the user interface module 506 to cause output on a personal safety device, such as a display, speaker, vibrator or other output device. In one embodiment, the user interface module 506 has a standard hardware interface that allows any input/output hardware that conforms to the interface to provide authentication information to the user authenticator module 510.

A user authenticator module 510 can provide a standard authentication interface for the system components by hiding the particulars of the underlying authentication mechanism. This allows new and developing authentication mechanisms (e.g., finger print detection, voice recognition, retinal scanning, blood or saliva analysis, facial feature analysis, vein analysis, etc.) to be seamlessly adopted without requiring modifications to other system modules. In one embodiment, the user authenticator module 510 can accept requests to perform authentication and can respond with a determination of whether or not the authentication was successful. In one embodiment, the authenticator has a standard hardware interface, which allows any authentication hardware that conforms to the interface to provide authentication information to the authenticator.

It will be appreciated by those of skill in the art that many more biometric identification methods which are not discussed herein are nonetheless fully within the scope and spirit of the present disclosure. In one embodiment, an offender may be required by their probation officer to periodically perform biometric identification to ensure that the offender has the device on their person. In another embodiment, registered sex offenders may be required by the government agencies to wear devices that alert the relevant authorities or the remote monitoring center that the sex offender has been in the presence of a child user or other at-risk person in an inappropriate or illegal place, for a maximum allowable time or by any other condition that would warrant investigation, suggest that someone is in danger, or that a crime is occurring.

In an embodiment, the personal safety device 100 further includes various self-defense mechanisms to assist the user 100 to ward off, thwart, or fight back against perpetrators or intruders. For example, the personal safety device 100 can include a hidden blade which, upon activation by the user 100, is deployed from an edge of the personal safety device 100 and acts as a weapon. The personal safety device 100 can also include a pepper-spray or mace deployment system. Furthermore, the personal safety device 100 can be equipped with a high-intensity strobe light mechanism to emit blinding light to a perpetrator or intruder. Finally, device 102 may be armed with tracking systems such as stains, chemicals, confetti and other means.

In an embodiment, the device 100 may collect biological data such as blood, sweat, hair, skin cells, and any other DNA source in order to identify the individual in the future. The device may then process this information on the spot or send the relevant data electronically to a processor on behalf of the user, the center or another appropriate entity such as law enforcement. In another embodiment, individuals may volunteer these samples and data as a way to confirm their identity and/or their intentions with the user.

In another embodiment, the personal safety device 100 can be equipped with deafening alarm speaker to alert passer-bys and to scare off intruders. The speaker can emit static sounds, emergency sounds such as police sirens, the sound of gun shots, or the sound of a barking dog. For example, the speaker can emit sounds so strange or foreign that they distract the user, or sounds with vibrating or frequency elements that render the person incapable of attacking, that interfere with their thought patterns, their ability to think or move their bodies, or in any other way that affects their ability to continue the suspected attack. Eventually these sounds may cause bodily damage, serious bodily damage, deafening, or even death, and may be used to defend someone in danger of serious bodily injury, kidnapping or death or in other ways approved or accepted by law.

Similarly, the speaker can be a remote speaker integrated within a vehicle, home security/entertainment center, or public address system. The remote monitoring center 108 can utilize the remote speaker to broadcast messages to warn or alert perpetrators. For example, if a perpetrator breaks into a user's home, the speakers in the home security system and/or entertainment center can emit an alarm or warning to the perpetrator. This embodiment requires that the remote speaker system is communicatively coupled to the remote monitoring center 108 via hard wire telephone line or a wireless connection.

In another example, if the user is traveling in a subway car and is attacked or approached by a perpetrator, the remote monitoring center 108 can emit an alarm or warning to the perpetrator through the subway car's public address system. This embodiment requires that the subway system is communicatively coupled to the remote monitoring center 108, and the remote monitoring center 108 is given the appropriate permissions and access to the subway car speaker system.

Similarly, public security cameras, such as traffic cameras can be utilized through a smart grid system to monitor and track perpetrators. For example, the remote monitoring center 108 can access the video surveillance system of a public utility, such as a transportation authority, and gain control of video cameras to track and record perpetrators.

With regards to incorporating the security network with an existing home security service and hardware, the remote monitoring center 108 can provide a security assessment to the home security provider. For example, the remote monitoring center 108, using the Algorithm, can determine that the user's neighborhood has experienced multiple break-ins or increased criminal activity on a particular day. The remote monitoring center 108 can relay this information to the home security provider, along with recommendations or offers to assist in monitoring or protecting the user.

The same principle as above can be applied to assisting first responders, such as law enforcement, emergency medical services, and fire fighters. For example, the remote monitoring center 108 can provide enhanced data or information to a first responder dispatch center regarding recent crime activity in an area, information regarding how populated an area is, how well lit or accessible an area is, etc. In another embodiment, the dispatch operator 120 can be connected directly to a first responder's mobile device, such as a walkie-talkie, mobile phone, earpiece, etc., and can relay real-time information to the first responder. For example, the dispatch operator 120 can inform a fire fighter that a hostile presence, such as an armed arsonist exists in the area.

In yet another embodiment, the remote monitoring center 108 can provide real-time images or information to first responders to help them with, for example, (a) identify the victim(s) or perpetrator(s), (b) gathering information on the location or situation, such as whether perpetrator has weapons and what kind, (c) what types of entry are available and how many other victims or perpetrators may be involved, (d) prioritize the allocation of resources, such as when multiple crimes are happening and in appearance are relatively higher resource demanding than in actuality, (d) assess other factors such as damage to a building, intensity of a fire or natural disaster, or any other information that could support decision making for first responders.

Figure 6:
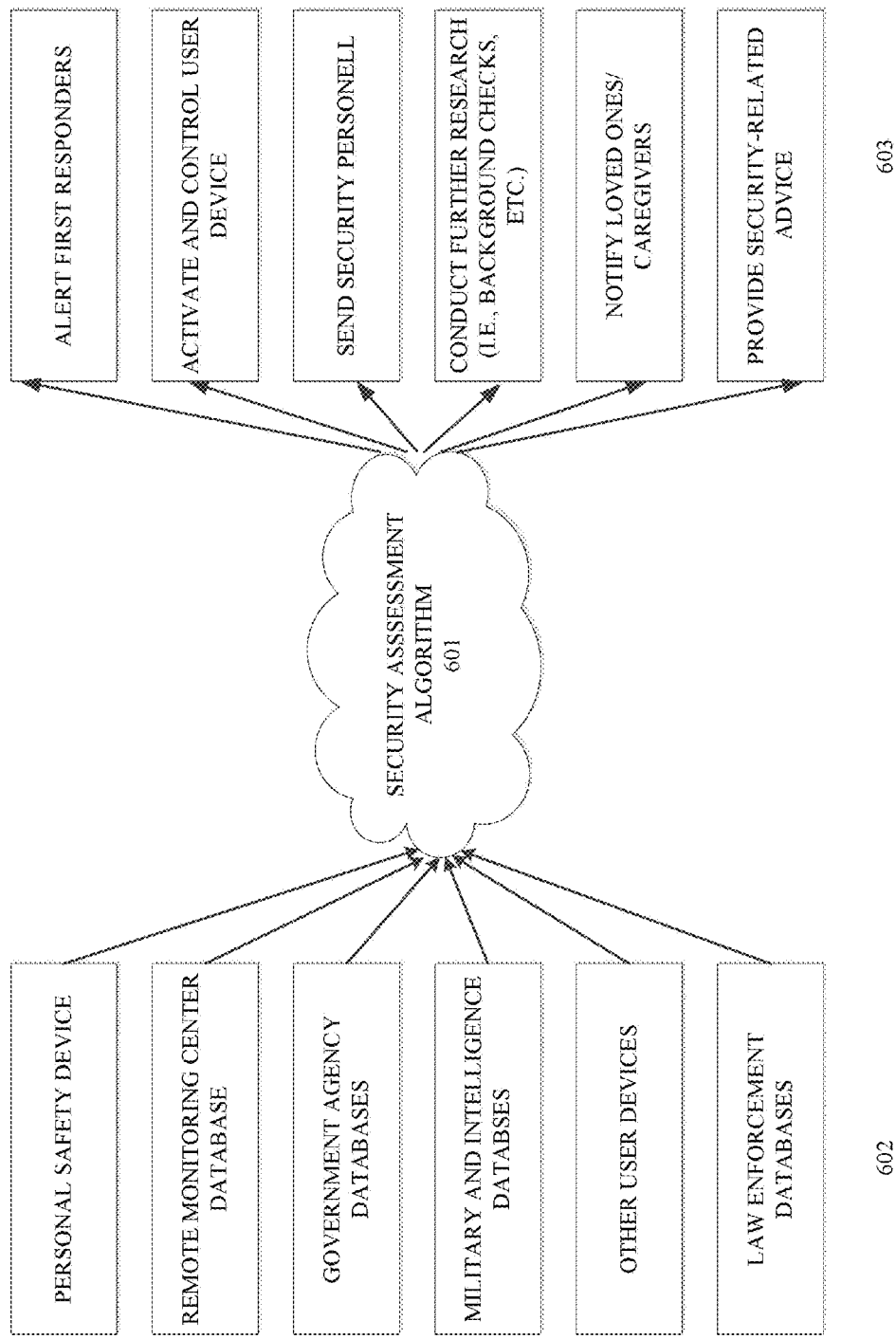
FIG. 6 is a system diagram of the security assessment algorithm inputs and outputs.

FIG. 6 is a system diagram of the security assessment algorithm inputs and outputs. In an embodiment, the Algorithm 601 can reside on a server or computer at the remote monitoring center, or it can be located off-site or on a virtual server. The Algorithm 601 is coupled to various data sources, such as, but not limited to, user personal safety devices, the remote monitoring center's information database, government agency databases, military and intelligence database, third-party home and office security provider systems, and law enforcement database.

For example, the Algorithm 601 can constantly receive real-time information from the user's personal safety device, such as location coordinates, speed of travel, audio/video/image data, temperature and moisture data, etc. This data can be transmitted in real-time without the user's knowledge whenever the device is active, and/or upon activation of a trigger or button by the user. In another embodiment, the data can be transmitted upon a request signal from the remote monitoring center.

The remote monitoring center's information database contains volumes of information from all of the users on the security network, such as location histories, call and incident histories, and image, videos, and sound files. This information can be accessed by the Algorithm 601 to determine prior activity, incidents, and persons which may be relevant to a current potentially threatening incident.

The government agency databases can include FBI, SBI, Bureau of Naturalization and Immigration, Border Patrol, ATF, Department of Homeland Safety, and other federal and state agency databases. The Algorithm 601 can access these databases to receive current information regarding outstanding warrants, criminal activity, missing persons, criminal histories, citizenship information, customs information, etc.

The military and intelligence databases can include CIA, armed services, and other covert and special forces databases that the remote monitoring center has pre-approved access to. In addition, the military and intelligence databases are not limited to United States databases, but can also include databases of foreign governments.

Similar to the government agency databases, local law enforcement databases can provide the Algorithm 601 real-time and historical arrest and criminal activity information, as well as the location of law enforcement officials throughout an area. This information can be used by the Algorithm 601 to determine crime statistics based on time of day and year, and specific to particular areas of, for example, a town or city.

The Algorithm 601 synthesizes information for at least the above-mentioned sources, including information entered by a dispatch operator at the remote monitoring center, to provide a security assessment of the user and/or a potentially threatening incident. The security assessment can be in the form of a color, such as red for high threat, yellow for medium threat, or green for a low threat. In another embodiment, the security assessment can be a range from zero to ten, ten being the highest threat, and zero representing no threat. In yet another embodiment, the security assessment can simply be a recommendation of responses.

After a security assessment is determined, it is presented to the dispatch operator at the remote monitoring center. For the purposes of this embodiment, the dispatch operator can be a live human or a computer system. Based on the security assessment, the dispatch operator then triggers an appropriate response. The responses can range from alerting first responders, such as law enforcement and fire fighters, to providing information regarding safety or how to operate in a potentially threatening situation. For example, as described above, a user on a date that becomes uncomfortable or suspicious of the other person's intentions could retreat to the bath room and request a background check. The Algorithm 601 would search federal and state databases for criminal history, any incidents reported to online dating sites regarding the person's profile, local law enforcement databases for reports of domestic abuse or outstanding warrants, etc. The Algorithm 601 can even cross-reference the remote monitoring center's information database, and if the person is also a member of the security network, if can search that person's activity and records. This feature may be subject to approval by each user, i.e., each user can either consent or opt-out of having their own personal records search in response to a query from another user. If the Algorithm 601 determines that there is no threat of harm from the person, the dispatch operator can simply provide escape routes or advice on how to end the date quickly and amicably.

However, if the Algorithm 601 determines that the person has a violent past, has recent criminal incidents regarding violence, is a registered gun owner, or if there is an outstanding warrant for the person's arrest, the dispatch operator can provide an escalated response. The response can include checking to see if there are any Spartan volunteers nearby who can escort the user safely away from the scene of the date and to a safe place. The response could also be alerting law enforcement of the person's whereabouts, and advising the user to retreat to a safe place until law enforcement arrived. At the same time, the dispatch operator can activate the user's personal safety device and communicate with the person, or take images, videos, and sound records of the person.

Thus, the Algorithm 601 is able to determine how unsafe a situation is or may become, and allow the remote monitoring center to provide an appropriate level of response to protect the user before any harm, damage, or injury occurs.

The services illustrated above can be used collaboratively to provide a proprietary safety network which includes safety monitoring, scheduled check-ins, location tracking, live advice on the law and law enforcement, local in-person support and safety training, and emergency assistance. In an embodiment, the services range from free automated monitoring to daily monitoring by monthly subscription to emergency support in any kind of situation or environment. The security provider can charge for per event services, long and short term subscriptions, 911 emergency service partnerships, mistaken or hoax calls, insurance-based coverage, and customized service offerings.

In another embodiment, the services illustrated above can be used in conjunction with partnerships or data feeds through dating sites such as Match.com and eHarmony.com, where safety content can be provided to online users regarding potential matches or prospective dates. For example, "Date Safe" and "Pre-Screen" services may be integrated with various online dating and networking websites.

Other partnerships may include vehicle and navigation device manufacturers, where GPS tracking can be integrated with the services described herein to provide enhanced security in addition to the conventional navigation services currently offered by manufacturers.

Yet other examples of partnerships include, but are not limited to, home security providers, car rental companies, emergency response companies, parcel and postal delivery companies, trucking companies, and executive security providers.

In another embodiment, a user could provide information on a "target", such as a victim, possible victim, suspect, or other individual or extraordinary event and by using their device, call the remote monitoring center to begin recording information relevant to that individual or event, including accessing other resources such as Spartans, local camera networks, etc. Such a service might be used to help track a missing child, a suspected criminal or an extraordinary event such as a UFO sighting, major disaster, or major event such as a bank robbery.

In another embodiment, when a user is in trouble, the remote monitoring center can also provide them the safest route to take to their destination.

In another embodiment, the safety network includes safety patrols of groups of volunteers that can orient people to join or pass by one of these. These groups or hordes of people might be on constant roaming patrols and the remote monitoring center can direct them to areas where people need company to get home. The group can also "swarm" an area lacking law and order or which is currently dangerous. This would mean brining dozens or hundreds of volunteers to "take back" a neighborhood.

In another embodiment, the Algorithm can make a safety recommendation for someone given whatever situation they are in (e.g., a date going bad or at a party and feeling pressure to stay or in the back of a bar and people aren't letting them out, etc).

In another embodiment, the remote monitoring center can connect a user to a drive-home service, or a taxi or a volunteer walk-home (in addition to 911, etc., and specifically for mitigation and safety management).

In another embodiment, the remote monitoring center can interact with any government agency, such as, for example, including the Department of Homeland Security, FEMA, the FBI, etc., not just local law enforcement.

In another embodiment, a "witness" could mark a spot with a laser or other by taking a picture that we could then mark on a map, this spot might represent several things, crime scene, last known location, where they spotted a potential missing child, where a crime will soon be committed, etc.

In another embodiment, parents or an insurance company could provide a bonus or reduced fees based on someone keeping their safety level at yellow, for example, which means they are staying out of dangerous areas, driving safely, not staying out too late, etc.

While the principles of the disclosure have been illustrated in relation to the exemplary embodiments shown herein, the principles of the disclosure are not limited thereto and include any modification, variation or permutation thereof.

What is claimed is:

1. A method of determining a security assessment and providing appropriate preventative responses, comprising:
   receiving at a server, a first data signal from a first database;
   receiving at the server, a second data signal from a user device or a third-party mobile device, the second signal containing image data or video data;
   receiving at the server, a third data signal from a second database, the third data signal containing historical user routine data;
   analyzing, by the server, the first data signal, the second data signal, and the third data signal;
   determining, by the server, a security assessment based on the first data signal, the second data signal, and the third data signal; and
   transmitting, by the server, a response signal based on the security assessment to at least one of the user device and a first responder, the response signal requiring a check-in from the user device.

2. The method of claim 1, where the first database is a law enforcement database, a military database, or a federal agency database.

3. The method of claim 1, wherein the first data signal includes information regarding criminal activity and crime statistics.

4. The method of claim 1, wherein the user device or the third-party mobile device is a cellular phone or a portable device.

5. The method of claim 1, wherein the second data signal comprises an image obtained by a camera on the user device or on the third-party mobile device.

6. The method of claim 1, wherein the second data signal comprises video obtained by a camera on the user device or on the third-party mobile device.

7. The method of claim 1, wherein the response signal is selected from a group consisting of a telephone call, a SMS (short message service) message, and an electronic mail message.

8. A method of predicting a probability of harm and providing appropriate preventative responses, comprising:
   receiving, at a server, a plurality of data signals from a plurality of data sources;
   receiving, at the server, image or video data from a user device or a third-party mobile device;
   receiving, at the server, past location history from the user device;
   receiving, at the server, user routine data from the user device or a remote server;

analyzing, at the server, the data signals, image or video data, user routine data, and the past location history to predict an occurrence of a potentially dangerous incident;

determining, by the server, an appropriate response to affect an outcome of the potentially dangerous incident; and transmitting, by the server, a check-in request to the user device requiring a check-in from a user.

9. The method of claim 8, wherein the data sources are selected from a group consisting of a remote user device; a government agency database, a military database, a law enforcement database, a weather database, and a security-provider database.

10. The method of claim 8, wherein the past location history is data, regarding the prior movement of the user device.

11. The method of claim 8, wherein the appropriate response is selected from a group consisting of alerting first responders, remotely controlling a remote user device by the server, alerting security personnel, providing advice, and conducting research related to the potentially dangerous incident.

12. A system for remotely monitoring an individual and providing varying levels of security assistance, consisting of:
a remote monitoring center communicatively coupled to a safety network;
a first safety device coupled to the safety network, wherein the safety device is configured to transmit data to the remote monitoring center;
a server communicatively coupled to the safety network and to the remote monitoring center, wherein the server is configured to receive a plurality of data signals from a plurality of data sources, the server further configured to receive past location history from a user device, the server further configured to receive past user routine data from the user device, and the server further configured to predict an occurrence of a potentially dangerous incident using the past location history and the past user routine data; and
a transmitter coupled to the server, the transmitter configured to transmit a check-in request to the user device requiring a check-in from a user.

13. The system of claim 12, wherein the remote monitoring center is communicatively coupled a first responder alerting system.

14. The system of claim 12, wherein the remote monitoring center is configured to transmit a signal to the first safety device based on the potentially dangerous incident predicted by the server.

15. The system of claim 12, wherein the remote monitoring center is configured to send a signal to a 911 call center based on the potentially dangerous incident predicted by the server.

16. The system of claim 12, wherein the remote monitoring center is configured to transmit a signal to a first responder alerting system based on the potentially dangerous incident predicted by the server.

17. The system of claim 12, wherein the remote monitoring center is configured to send a signal to second safety device based on the potentially dangerous incident predicted by the server, wherein the second safety device is communicatively coupled to the safety network.

18. The system of claim 12, wherein the first safety device has a touch-sensitive display screen.

19. The system of claim 12, wherein the first safety device has image and video recording means.

20. The method of claim 12, wherein the past location history is data, regarding the prior movement of the user device.

* * * * *